United States Patent
Zhou

(10) Patent No.: US 9,015,125 B2
(45) Date of Patent: Apr. 21, 2015

(54) FLEXIBLY MANAGING RECORD RETENTION VIA A RECORDS MANAGEMENT SOFTWARE PROGRAM

(71) Applicant: International Business Machines Corporation, Armonk, NY (US)

(72) Inventor: Li Zhou, Irvine, CA (US)

(73) Assignee: International Business Machines Corporation, Armonk, NY (US)

(*) Notice: Subject to any disclaimer, the term of this patent is extended or adjusted under 35 U.S.C. 154(b) by 139 days.

(21) Appl. No.: 13/773,691

(22) Filed: Feb. 22, 2013

(65) Prior Publication Data

US 2014/0244591 A1    Aug. 28, 2014

(51) Int. Cl.
*G06F 17/00* (2006.01)
*G06F 17/30* (2006.01)

(52) U.S. Cl.
CPC ................. *G06F 17/30303* (2013.01)

(58) Field of Classification Search
CPC ....................................... G06F 17/30
USPC ................................... 707/600–899
See application file for complete search history.

(56) References Cited

U.S. PATENT DOCUMENTS

| 8,131,683 | B2 | 3/2012 | Fridrich |
| 2005/0192830 | A1 | 9/2005 | Pugh et al. |
| 2009/0228525 | A1* | 9/2009 | Fridrich .................. 707/201 |
| 2012/0136904 | A1 | 5/2012 | Venkata Naga Ravi |

* cited by examiner

*Primary Examiner* — Isaac M Woo
(74) *Attorney, Agent, or Firm* — Nicholas Cadmus; Abdul-Samad Adediran

(57) ABSTRACT

Program code determines whether a retention base, defined as a property within a disposition schedule has a value, wherein the disposition schedule defines additional properties and instructions for disposal of a record, and wherein the additional properties include a retention period. The program code identifies a change to at least one of the retention base and the retention period. The program code generates a point in time to perform the disposal of the record based on the change that is identified, wherein the disposal is an action defined for a phase of the disposition schedule.

18 Claims, 4 Drawing Sheets

__US 9,015,125 B2__

FLEXIBLY MANAGING RECORD RETENTION VIA A RECORDS MANAGEMENT SOFTWARE PROGRAM

BACKGROUND

1. Field of the Invention

The present invention relates generally to records management software programs, and more particularly to a records management software program having program code for managing record retention.

2. Description of the Related Art

An end-user can utilize a records management system to manage records. A records management system uses disposition schedules to control the retention and disposal of records. Disposition schedules define the retention rules for records and instructions for the disposal of records at the end of the retention period. The primary components of a disposition schedule include a disposal trigger, cutoff, and one or more disposition phases. The disposal trigger specifies a condition that initiates the disposal of a record. Cutoff is a condition that marks the beginning of the phases of the disposition schedule, and is a signal to the records management system that the record being disposed of is no longer active and can transition through each of the phases. Cutoff includes a cutoff date which is a date property calculated based on a cutoff base and offset. The one or more disposition phases (i.e., disposition process steps) each define a default retention period as well as a disposition action, wherein subsequent to the default retention period for a particular phase elapsing, the specified disposition action can be performed. A record includes a date property, and the name of the date property is current phase execution date, wherein the current phase execution date is a point in time in which the disposition action of the current disposition phase is to be performed on the record.

At present, when configuring the disposition phase's default retention period within a disposition schedule the default retention period does not include any option for selecting an appropriate retention base. As a result, the cutoff date is always utilized as the retention base for the default retention period in order to calculate the current phase execution date for a record. Moreover, based on how a disposition sweep operation generates the cutoff date for a record, if the cutoff date has been reached, then the cutoff date is not changed upon subsequent runs of the disposition sweep operation even when the original cutoff base that was utilized to generate the cutoff date might have changed. If the cutoff date is not changed subsequent to the original cutoff base being changed, then this prevents the disposition sweep operation from calculating the correct current phase execution date for a record. In addition, if the disposition current phase execution date is incorrect, then the corresponding disposition schedule will be inaccurate and not in accord with the end-user's business requirements. An inaccurate disposition schedule can cause an unintended destruction of records, which can result in penalties that can include fines for violation of government regulations or even a damages award for breach of contract. In addition, failure to remove records managed by a records management system when the intended lifespan of the records have expired can degrade performance of the records management system.

SUMMARY

Aspects of an embodiment of the present invention disclose a method, computer system, and program product for managing record retention. A computer determines at least one of a retention base and a retention period within a disposition schedule has changed. The computer generates a point in time based on the change, to perform an action on a record wherein the action is defined for a phase of the disposition schedule.

BRIEF DESCRIPTION OF THE SEVERAL VIEWS OF THE DRAWINGS

The subject matter which is regarded as an embodiment of the present invention is particularly pointed out and distinctly claimed in the claims at the conclusion of the specification. One manner in which recited features of an embodiment of the present invention can be understood is by reference to the following detailed description of embodiments, taken in conjunction with the accompanying drawings in which:

DETAILED DESCRIPTION

Figure 1:
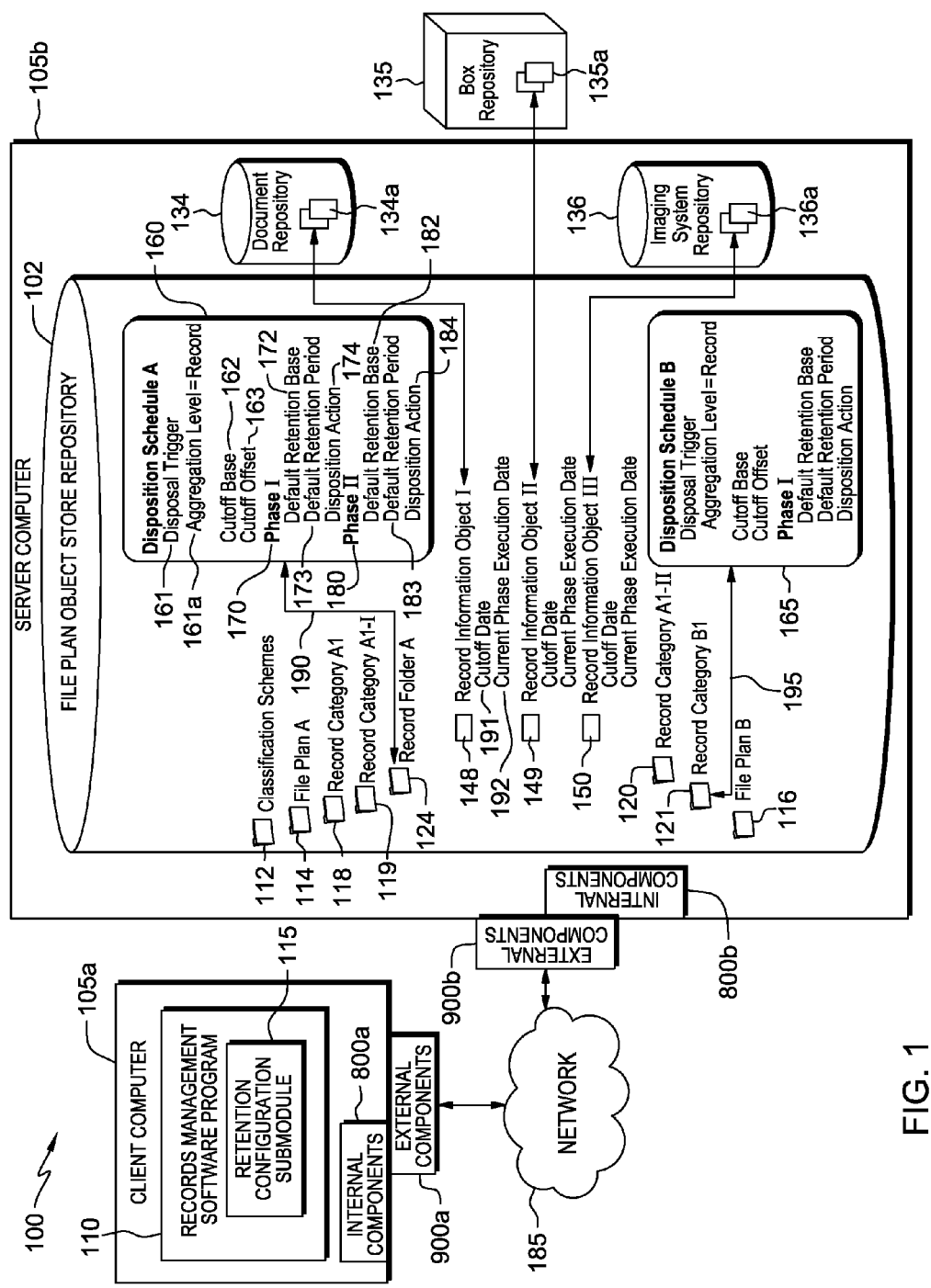
FIG. 1 is a block diagram of a computer system with a server computer having a file plan object store that interacts with a client computer, wherein the client computer has a records management software program with program code for determining whether a default retention base defined within a phase of a disposition schedule has a value, program code for identifying a change to the default retention base and/or default retention period, and program code for generating a point in time to perform a disposition action defined for the phase based on the change identified.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like, conventional procedural programming languages such as the "C" programming language, a hardware description language such as VERILOG, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Exemplary embodiments now will be described more fully herein with reference to the accompanying drawings. This disclosure may, however, be embodied in many different forms and should not be construed as limited to the exemplary embodiments set forth herein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

Embodiments of the present invention provide a records management software program with program code for determining whether a default retention base defined within a phase of a disposition schedule has a value, identifying a change to the default retention base and/or default retention period, and generating a point in time to perform a disposition action defined for a phase of the disposition schedule based on the change identified.

FIG. 1 illustrates computer system 100 that includes client computer 105a, server computer 105b, and network 185. Client computer 105a and server computer 105b each include respective internal components 800a and 800b, and respective external components 900a and 900b, as described below in more detail with respect to FIG. 3. Client computer 105a is installed with records management software program 110 having retention configuration submodule 115. Records management software program 110 is program code that enables an end-user to electronically manage documents by utilizing folders (i.e., containers), wherein each folder can have sub-folders (i.e., sub-containers), and wherein at least one of the folders has an assigned disposition schedule for handling disposal of the documents. The term disposal as used hereinafter refers to electronically transferring, reviewing, destroying, and/or archiving the records and even documents associated to the records. Particularly, retention configuration submodule 115 is the program code that includes at least the following functionality: determining whether a default retention base defined within a phase of a disposition schedule has a value, identifying a change to the default retention base and/or default retention period, and generating a point in time to perform a disposition action defined for the phase of the disposition schedule based on the change identified.

Server computer 105b includes file plan object store repository 102 storing at least properties and rules utilized for managing record retention which includes the disposal of documents such as, for example, electronic documents 134a, physical documents 135a, and image documents 136a. Electronic documents 134a are stored solely electronically in document repository 134 on server computer 105b, whereas physical documents 135a are stored in a tangible form (e.g., each stored in a box or in a file cabinet). Specifically, physical documents 135a are documents that reside on physical media such as paper, a CD, a DVD, and even a memory card and are stored solely physically in box repository 135. Electronic documents 134a can include plaintext files, audio files, and video files. Moreover, image documents 136a are stored in image system repository 136 on server computer 105b, and image documents 136a can be images in various image file formats such as the following: BMP, GIF, JPEG, PNG, TIFF, etc. In the disclosed embodiment, repositories 102, 134 and 136 all reside on server computer 105b. However, in other embodiments repositories 102, 134 and 136 can each reside on separate computers.

Repositories 102, 134 and 136 can each be configured to store data within fields having various data types that include: text, numeric, currency, data, memo, hyperlink, and object. Particularly, file plan object store repository 102 is a repository that includes a hierarchy of arranged folders, which includes sub-folders, for classifying, organizing, and managing records such as record information object I 148, record information object II 149, and record information object III 150 as well as managing disposal of respective documents 134*a*, 135*a*, and 136*a*. Each record (i.e., record information object I 148, record information object II 149, and record information object III 150) is associated to a cutoff date property and a current phase execution date property, wherein the current phase execution date property is a point in time in which disposition action 174 or disposition action 184 of respective current phase I 170 or phase II 180 is to be performed. Particularly, record information object I 148 is associated to cutoff date 191 and current phase executing date 192. Cutoff date 191 and current phase executing date 192 are both properties of record information object I 148. The highest level folder in the hierarchy is classification schemes 112, wherein classification schemes 112 is utilized to organize file plan A 114 and file plan B 116. Specifically, classification schemes 112 has sub-folders that include file plan A 114 and file plan B 116 each utilized for defining a taxonomy of sub-folders (e.g., record categories and record folders) within file plan object store 102. In the disclosed embodiment, file plan A 114 includes the following sub-folders: record category A1 118, record category A1-I 119, record category A1-II 120, record category B1 121, and record folder A 124. Record folder A 124 includes the records mentioned above. Record category A1 118 includes record category A1-I 119 and record category A1-II 120 as a sub-folders. Thus, a record category can include other record categories as sub-folders. In addition, in the disclosed embodiment, file plan B 116 does not include any sub-folders, but in other embodiments file plan B 116 can be configured to include sub-folders.

In addition to defining a taxonomy of sub-folders, record category A1 118, record category A1-I 119, record category A1-II 120, record category B1 121, and record folder A 124 can each be further utilized for declaring rules. For example, record folder A 124 is utilized for declaring rules associated to the records mentioned above. In addition, each of the records has a specified format that enables computer system 100 to locate and access respective documents 134*a*, 135*a*, and 136*a*. The rules associated to the records can be declared within record folder A 124, or even within one of the sub-folders mentioned above such as record category A1 118 or record category A1-I 119.

In the disclosed embodiment, the rules associated to the records are declared within record folder A 124 and are encapsulated by disposition schedule A 160 that can be utilized to manage record folder A 124 based on end-user requirements. Specifically, record folder A 124 is associated to disposition schedule A 160, as shown by connector 190. Disposition schedule A 160 can define various properties and instructions (e.g., disposition actions) based on end-user requirements. Specifically, in the disclosed embodiment, disposition schedule A 160 includes the following properties: disposal trigger 161, cutoff base 162, cutoff offset 163, phase I 170, and phase II 180. Phase I 170 defines default retention base 172, default retention period 173, and disposition action 174. Phase II 180 defines default retention base 182, default retention period 183, and disposition action 184. Default retention base 172 and 182, and cutoff base 162 are dates. Default retention base 172 and default retention base 182 can each be utilized to generate a current phase execution date for a record (e.g., record information object I 148, record information object II 149, and record information object III 150).

Furthermore, cutoff date 191 is a property associated to record information object I 148. Cutoff date 191 is calculated by summing cutoff base 162 and cutoff offset 163, wherein cutoff base 162 and cutoff offset 163 are configurable by a system programmer/administrator based on end-user requirements. Cutoff base 162 is a time (i.e., calendar date) after which record folder A 124 is considered inactive and no new records can be subsequently added within record folder A 124. Moreover, cutoff offset 163 enables a system programmer/administrator to extend the time defined by cutoff base 162, based on an end-user's requirements. Cutoff date 191 is a time (i.e., calendar date), generated by a disposition sweep operation, after which a record being disposed of is considered to be inactive and no longer useful to the end-user, wherein the record can be processed by records management software program 110 to transition through phase I 170 and phase II 180 defined in disposition schedule A 160. As the record is transitioned through phase I 170, a disposition sweep operation calculates this record's current phase execution date 192 by summing both default retention base 172 and default retention period 173 of phase I 170. During phase I 170 and phase II 180, respective disposition actions 174 and 184 are performed on the records. In the disclosed embodiment, disposition schedule A 160 is associated to each record within record folder A 124 as explained in more detail below, but in other embodiments each record within record folder A 124 can each be associated to a different disposition schedule.

Disposal trigger 161 is a property that defines a trigger condition and an aggregation level 161*a*. If the trigger condition is satisfied, then disposition actions 174 and 184 can be initiated and performed on records. The trigger condition being satisfied signals that disposition (i.e., disposal) of a record can begin. Particularly, the trigger condition is a signal that indicates a specific condition has occurred that will allow the remaining disposition properties (i.e., cutoff date, current phase execution date, etc.) to be calculated. For example, a record associated to a contract might be triggered for disposal by a contract expiration date being set. Thus, while a record associated to a contract is still active and not yet expired the contract expiration date value for this record remains null, but as soon as the contract expiration date is set for the record associated to the contract, disposition of this record is triggered.

Aggregation level 161*a* is a defined level at which elements of a file plan (e.g., file plan A 114 or file plan B 116) are processed for disposition. Specifically, if aggregation level 161*a* is defined at the record folder level, then a record folder and all records within the record folder will be considered for disposition as a single unit. Otherwise, if aggregation level 161*a* is defined at the record level (i.e., record information object level), then records within a folder are individually considered for disposition. In the disclosed embodiment, aggregation level 161*a* is defined at the record level. Accordingly, since aggregation level 161*a* is defined at the record level, the records that are in record folder A 124 are individually considered for disposition.

Furthermore, each of the records include metadata and a reference to one of respective documents 134*a*, 135*a*, and 136*a*. In the disclosed embodiment, the metadata and the reference are stored as properties in each of the records on a hard disk of server computer 105*b*, but in other embodiments the metadata and the reference can be stored in a database on a hard disk of a computer other than server computer 105*b*. The metadata of each record can describe respective documents 134*a*, 135*a*, and 136*a* that are referenced. Moreover, each of the references to documents 134*a*, 135*a*, and 136*a* can be a pointer having address data associated to a location of where respective documents 134*a*, 135*a*, and 136*a* are stored within one of repositories 134, 135, and 136. The rules, mentioned above, associated to the records include rules for governing end-user role-based access to the records and to respective documents 134a, 135a and 136a referenced. In addition, the rules associated to the records also include rules for disposal (e.g., transferring, reviewing, destroying, and/or archiving) of respective documents 134a, 135a, and 136a referenced. Moreover, in one embodiment, disposition actions 174 and 184 can be performed on the records only if all the rules associated to the records are satisfied. Thus, disposition actions (e.g., disposition actions 174 and 184) are not performed on the records if one or more of the rules are violated.

In the disclosed embodiment, record information object I 148 has a reference to one of electronic documents 134a stored in document object store repository 134, record information object II 149 has a reference to one of physical documents 135a stored in box repository 135, and record information object III 150 has a reference to image documents 136a stored in image system repository 136. Electronic documents 134a are stored solely electronically, whereas physical documents 135a are in a tangible form (e.g., each stored in a box or in a file cabinet). Furthermore, image documents 136a can be images in various image file formats such as the following: BMP, GIF, JPEG, PNG, TIFF, etc. In addition, the reference by record information object I 148 to one of electronic documents 134a or a reference by record information object II 149 to one of physical documents 135a is not limited to a reference to a particular type of document. For example, record information object I 148 can reference various types of electronic documents that include the following document types: formal electronic documents such as contracts, invoices, licenses, patents, and instructions manuals; informal electronic documents such as e-mail, e-mail attachments, meeting notes, and text messages; and content such as audio files and video files. In addition, record information object II 149 can reference various physical media type of documents such as paper documents, and documents saved on CD, DVD, and on other medias.

The records each have an intended lifespan defined by one or more phases (i.e., one or more sets of properties and data processing instructions) within a disposition schedule (e.g., disposition schedule A 160 and/or disposition schedule B 165). During each of the phases a disposition action (e.g., disposition action 174 or 184) can be applied to one or more of the records. The disposition action applied to the records can include archiving, reviewing, transferring, or destroying the records. In the disclosed embodiment, record folder A 124 is assigned (shown by connector 190) disposition schedule A 160, but in other embodiments disposition schedule A 160 can be assigned to either record category A1 118 or record category A1-I 119. In addition, disposition schedule B 165 is assigned (shown by connector 195) to record category B1 121. Thus, in the disclosed embodiment, disposition schedule A 160 is assigned to each record within record folder A 124, but in other embodiments a different disposition schedule can be assigned to each record within record folder A 124.

Figure 2A:
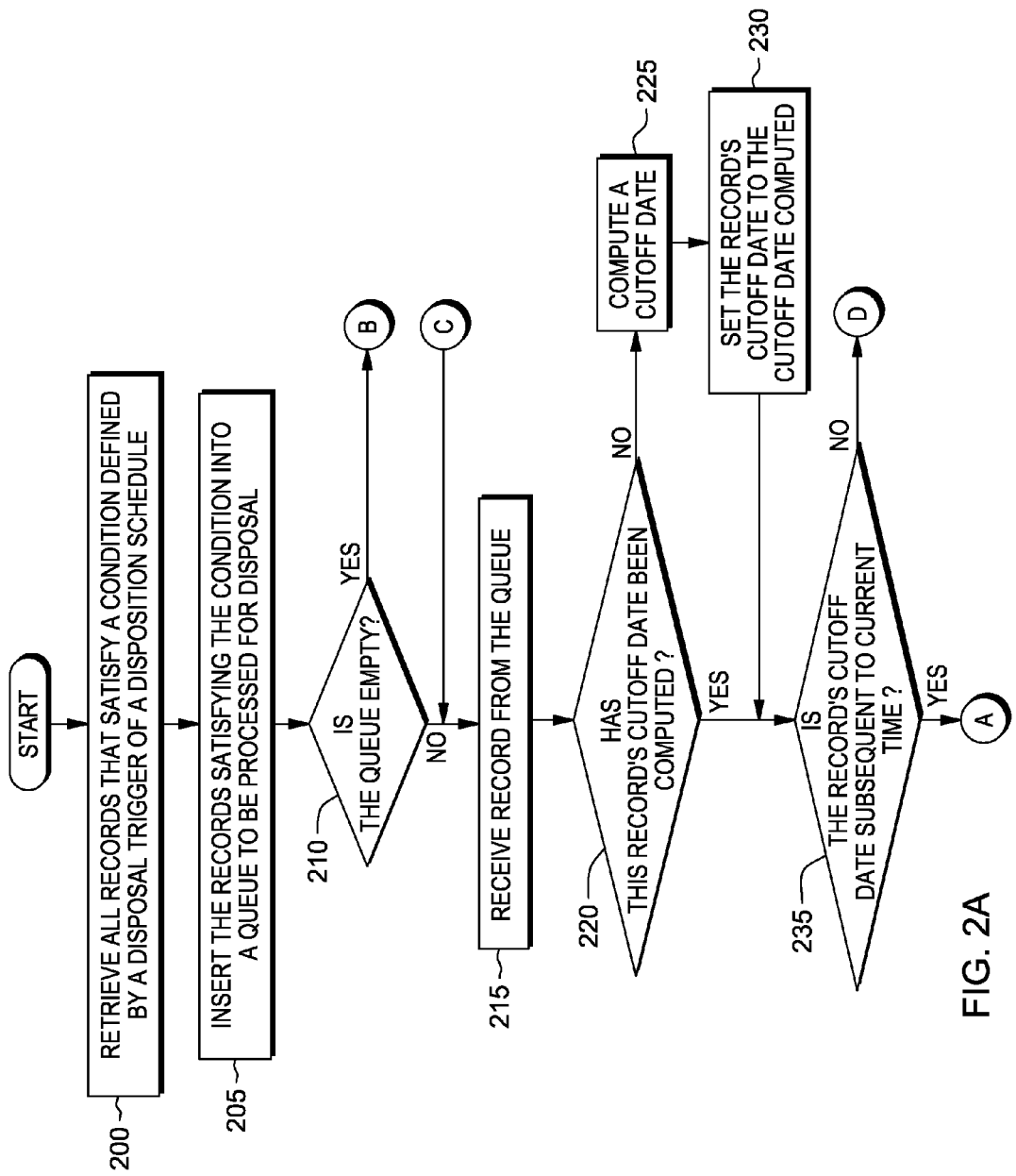
FIGS. 2A and 2B are flowcharts illustrating operations of the program code according to an embodiment of the present invention.
Figure 2B:
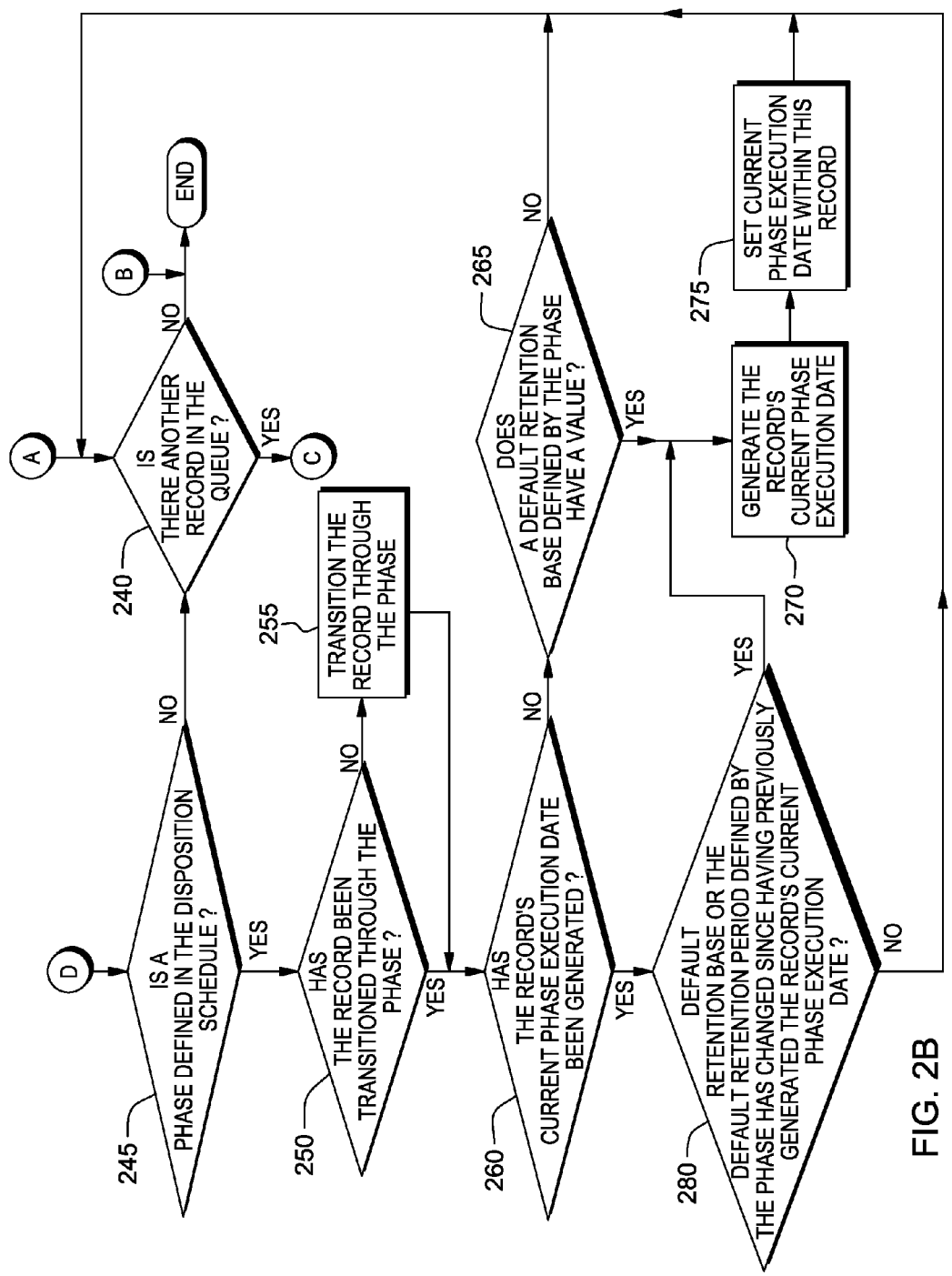

FIGS. 2A and 2B are flowcharts illustrating the steps of program code, retention configuration submodule 115, for determining whether a default retention base defined within a phase of a disposition schedule has a value, identifying a change to the default retention base and/or default retention period, and generating a current phase execution date (i.e., a point in time) to perform a disposition action defined for a phase of the disposition schedule based on the change identified.

In the disclosed embodiment, the program code retrieves all records (i.e., record information object I 148, record information object II 149, and record information object III 150) that satisfy a condition defined by disposal trigger 161 of disposition schedule A 160 (block 200). Next, the program code inserts the records satisfying the condition into a queue to be processed for disposal (block 205). If the queue is empty (the "YES" branch of decision block 210), then there is no record that satisfies the condition defined by disposal trigger 161 and the program code ends. In the disclosed embodiment, the program code can process the records in the queue in a specified order based on the requirements of an end-user. Specifically, the records are sequentially processed in the queue based on First-In-First-Out (FIFO) rule. Thus, the program code first processes record information object I 148 in the queue, subsequently processes record information object II 149 in the queue, and then subsequently processes record information object III 150 in the queue. In other embodiments, the records in the queue can be sequentially processed based on Last-In-Last-Out (LIFO) rule.

However, if the queue is not empty (the "NO" branch of decision block 210), then the program code receives a record (e.g., record information object I 148, record information object II 149, or record information object III 150) from the queue (block 215), and determines whether the record's cutoff date (e.g., cutoff date 191) has been computed (decision block 220). If the record's cutoff date has been computed (the "YES" branch of decision block 220), then the program code determines whether the record's cutoff date is subsequent to the current time (decision block 235). Otherwise, if the record's cutoff date has not been computed (the "NO" branch of decision block 220), then the program code computes a cutoff date (block 225). Specifically, in the disclosed embodiment, the cutoff date is computed by adding cutoff base 162 and cutoff offset 163. Subsequent to the program code computing the cutoff date the program code sets the record's cutoff date to the cutoff date computed (block 230).

Next, the program code determines whether the record's cutoff date is subsequent to the current time (decision block 235). If this record's cutoff date is subsequent to the current time (the "YES" branch of decision block 235), then the program code determines whether there is another record in the queue (decision block 240). Moreover, if the record's cutoff date is subsequent to the current time this indicates the record is not ready for cutoff. If there is another record in the queue (the "YES" branch of decision block 240) then program code continues, and receives the next record from the queue (block 215). Otherwise, if there is not another record in the queue (the "NO" branch of decision block 240), then the program code ends.

However, if this record's cutoff date is on or before the current time (the "NO" branch of decision block 235), then the program code determines whether there is a phase (e.g., phase I 170 and phase II 180) defined in disposition schedule A 160 (decision block 245). If no phase is defined in disposition schedule A 160 (the "NO" branch of decision block 245), then the program code continues to determine whether there is another record in the queue (decision block 240). Otherwise, if there is a phase defined in disposition schedule A 160 (the "YES" branch of decision block 245), then the program code determines whether the record has been transitioned through the phase (decision block 250). If this record has not been transitioned through the phase (the "NO" branch of decision block 250), then the program code transitions the record through the phase (block 255).

Next, as the record is transitioned through the phase, the program code determines whether the record's current phase execution date (e.g., current phase execution date 192) has been generated (decision block 260). If the record's current phase execution date has not been generated (the "NO" branch of decision block 260), then the program code determines whether a default retention base (e.g., default retention base 172 or 182) defined by the phase has a value (decision block 265). Moreover, a determination that the record's current phase execution date has not been generated can indicate that the record's current phase execution date is being generated for a first time.

If the program code determines that the default retention base defined by the phase has a value (the "YES" branch of decision block 265), then program code generates the record's current phase execution date (block 270). Specifically, the program code generates the record's current phase execution date by adding the default retention base (e.g., default retention base 172) and a default retention period (e.g., default retention period 173). However, if the program code determines that the default retention base defined by the phase does not have a value (the "NO" branch of decision block 265), then the program code determines whether there is another record in the queue (decision block 240). In order to determine whether the default retention base defined by the phase has a value, the program code verifies the record's property utilized (i.e., referenced) as the default retention base (e.g., default retention base 172 or 182) is neither null nor a value recognized by the program code as being invalid. Thus, if the record's property referenced as the default retention base is null or invalid, then the program code does not recognize the retention base as having a value. For example, if the end-user of the program code is a business having a customer with an account, then the customer's account close date is a property that can be referenced and utilized as the default retention base in which case the program code verifies the account close date property has a calendar date as a value. A default retention base that is null (i.e., having no value or an invalid value) can be an indication that the record is not ready for disposition.

However, if the record's current phase execution date has been generated (the "YES" branch of decision block 260), then the program code determines whether a default retention base or a default retention period defined by the phase has changed since having previously generated the record's current phase execution date (decision block 280). Specifically, if the record's current phase execution date has been previously generated and either the default retention base or the default retention period changed subsequent to the generation of the current phase execution date, then the program code verifies that a property utilized as the default retention base has changed, and also verifies that the default retention period has changed since the most recent generation of the record's current phase execution date.

If the program code determines that the default retention base and the default retention period defined by the phase has not changed (the "NO" branch of decision block 280), then the program code determines whether there is another record in the queue (decision block 240). Otherwise, if the program code determines that the default retention base or the default retention period defined by the phase has changed (the "YES" branch of decision block 280), then based on the change the program code generates the record's current phase execution date (block 270). Specifically, to generate the record's current phase execution date the program code adds the default retention base to the default retention period. For example, if the default retention base is defined as the customer's account close date and the record's account close date is May, 5, 2012 and the default retention period is 7 years, then the record's current phase execution date is May 5, 2019. Thus, the disposition action will be performed on the record on May 5, 2019. As another example, if a property (e.g., account close date) utilized by the default retention base changes from May 5, 2012 to Oct. 5, 2012 and the default retention period is still 7 years, then the record's current phase execution date must be re-generated by the program code to reflect the date of Oct. 5, 2019 as the correct date to perform the disposition action on the record.

Next, the program code sets the current phase execution date within the record (block 275). The program code determines if there is another record in the queue (decision block 240). If there is another record in the queue (the "YES" branch of decision block 240) then program code continues, and receives a record from the queue (block 215). Otherwise, if there is not another record in the queue (the "NO" branch of decision block 240), then the program code ends.

Figure 3:
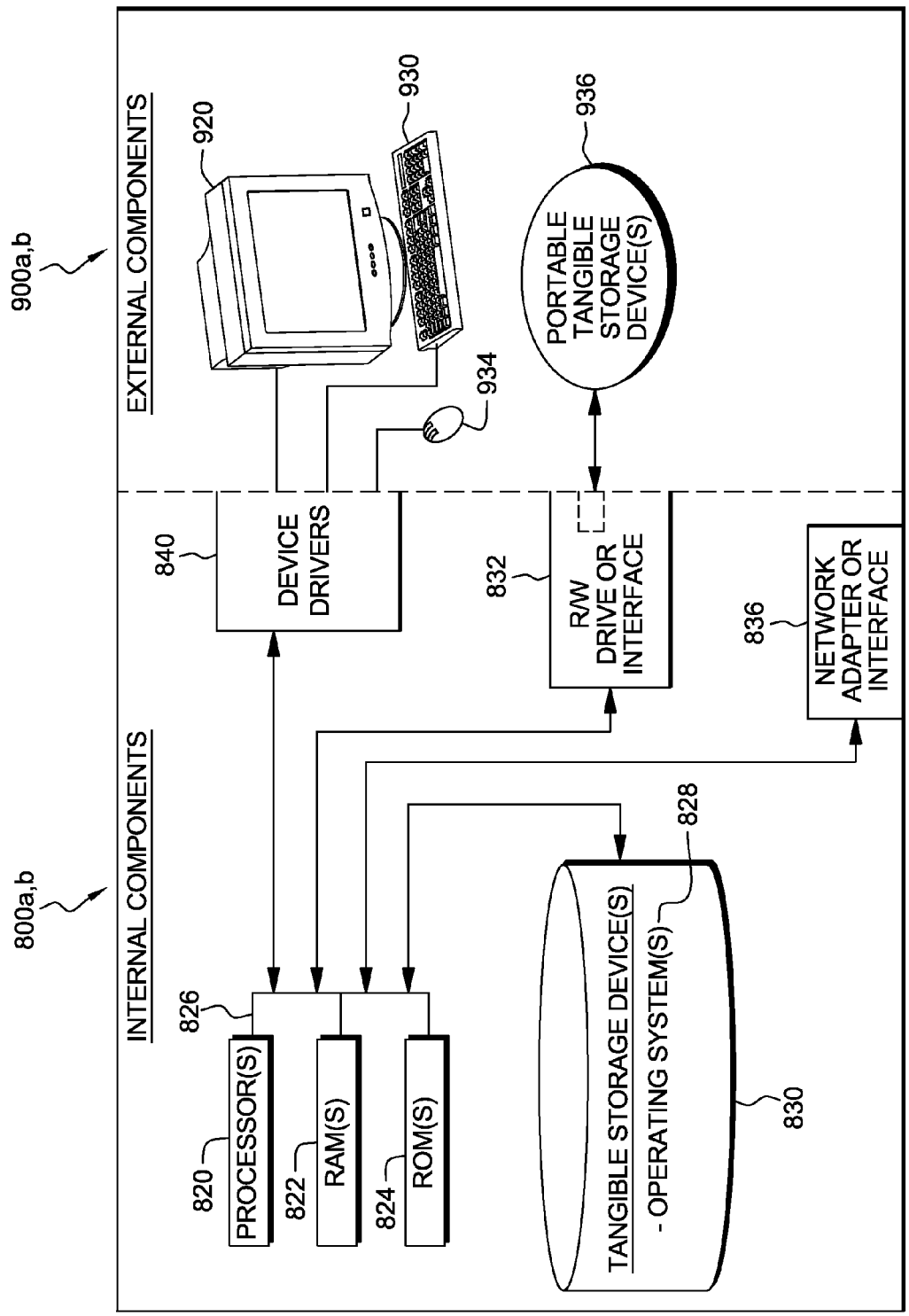
FIG. 3 is a block diagram depicting internal and external components of the client computer and the server computers of FIG. 1 according to an embodiment of the present invention.

FIG. 3 is a block diagram depicting a set of internal components 800*a* and a set of external components 900*a* that correspond to respective client computer 105*a*, as well as a set of internal components 800*b* and a set of external components 900*b* that correspond to server computer 105*b*. Internal components 800*a* and 800*b* each include one or more processors 820, one or more computer readable RAMs 822 and one or more computer readable ROMs 824 on one or more buses 826, and one or more operating systems 828 and one or more computer readable tangible storage devices 830. The one or more operating systems 828 and retention configuration submodule 115 of retention management software program 110 on client computer 105*a* are stored on one or more of the respective computer readable tangible storage devices 830 for execution by one or more of the respective processors 820 via one or more of the respective RAMs 822 (which typically include cache memory). In the embodiment illustrated in FIG. 3, each of the computer readable tangible storage devices 830 is a magnetic disk storage device of an internal hard drive. Alternatively, each of the computer readable tangible storage devices 830 is a semiconductor storage device such as ROM 824, EPROM, flash memory or any other computer readable tangible storage device that can store a computer program and digital information.

Each set of internal components 800*a* and 800*b* includes a R/W drive or interface 832 to read from and write to one or more portable computer readable tangible storage devices 936 such as CD-ROM, DVD, memory stick, magnetic tape, magnetic disk, optical disk or semiconductor storage device. Retention configuration submodule 115 on client computer 105*a* can be stored on one or more of the respective portable computer readable tangible storage devices 936, read via the respective R/W drive or interface 832 and loaded into the respective hard drive or computer readable tangible storage device 830.

Furthermore, each set of internal components 800*a* and 800*b* also includes a network adapter or interface 836 such as TCP/IP adapter card, wireless wi-fi interface card, or 3G or 4G wireless interface card or other wired or wireless communication link. Retention configuration submodule 115 can be downloaded to respective client computer 105*a* from an external computer or external storage device via a network (for example, the Internet, a LAN, or a WAN) and respective network adapters or interfaces 836. From the network adapter or interface 836, retention configuration submodule 115 on client computer 105*a* is loaded into at least one respective hard drive or computer readable tangible storage device 830. The network may comprise copper wires, optical fibers, wireless transmission, routers, firewalls, switches, gateway computers and/or servers.

Each set of external components 900*a* and 900*b* can include a computer display monitor 920, a keyboard 930, and a computer mouse 934. External components 900a and 900b can also include touch screens, virtual keyboards, touch pads, pointing devices, and other human interface devices. Each set of internal components 800a and 800b also includes device drivers 840 to interface to computer display monitor 920, keyboard 930 and computer mouse 934. The device drivers 840, R/W drive or interface 832 and network adapter or interface 836 comprise hardware and software in which the software is stored in computer readable tangible storage device 830 and/or ROM 824.

It should be appreciated that FIG. 3 provides only an illustration of one implementation and does not imply any limitations with regard to the environments in which different embodiments may be implemented. A variety of modifications to the depicted environments may be implemented. Moreover, a variety of modifications to the depicted environments may be made based on design and implementation requirements.

In accordance with the foregoing, a method, a computer system, and a computer program product have been disclosed for determining whether a default retention base defined within a phase of a disposition schedule has a value, identifying a change to the default retention base, and generating a point in time to perform an action defined for a phase of the disposition schedule based on the change identified. However, numerous modifications and substitutions can be made without deviating from the scope of an embodiment of the invention. Therefore, one or more embodiments of the invention have been disclosed by way of example and not limitation.

What is claimed is:

1. A method for managing record retention comprising:
   determining an original point in time to perform an action on a record by summing an original retention base and an original retention period within a disposition schedule;
   determining that the original retention period within the disposition schedule has changed; and
   generating an updated point in time based on the change, to perform an action on a record, by summing the original retention base and the changed retention period, wherein the action is defined for a phase of the disposition schedule.

2. The method of claim 1, wherein the disposition schedule defines additional properties and instructions for disposal of the record having metadata and a reference to a document, and wherein the additional properties comprise a condition that if satisfied permits the disposal of the record.

3. The method of claim 1, wherein the action comprises at least one of transfer, review, destruction, and archival of the record.

4. The method of claim 1, wherein the retention base references a property that is a calendar date, and wherein the retention period references a property that is a duration of time, and wherein the retention base and the retention period are used to generate the point in time at which the action is performed on the record.

5. The method of claim 1, wherein the action is performed on the record if a trigger condition within the disposition schedule is satisfied.

6. The method of claim 1, wherein the action is performed in accordance with one or more rules associated to the record.

7. A computer program product for managing record retention comprising:
   a computer readable storage medium and program instructions stored on the computer readable storage medium, the program instructions comprising:
   program instructions to determine an original point in time to perform an action on a record by summing an original retention base and an original retention period within a disposition schedule;
   program instructions to determine that the original retention period within the disposition schedule has changed; and
   program instructions to generate an updated point in time based on the change, to perform an action on a record, by summing the original retention base and the changed retention period, wherein the action is defined for a phase of the disposition schedule.

8. The computer program product of claim 7, wherein the disposition schedule defines additional properties and instructions for disposal of the record having metadata and a reference to a document, and wherein the additional properties comprise a condition that if satisfied permits the disposal of the record.

9. The computer program product of claim 7, wherein the action comprises at least one of transfer, review, destruction, and archival of the record.

10. The computer program product of claim 7, wherein the retention base references a property that is a calendar date, and wherein the retention period references a property that is a duration of time, and wherein the retention base and the retention period are used to generate the point in time at which the action is performed on the record.

11. The computer program product of claim 7, wherein the action is performed on the record if a trigger condition within the disposition schedule is satisfied.

12. The computer program product of claim 7, wherein the action is performed in accordance with one or more rules associated to the record.

13. A computer system for managing record retention comprising:
   one or more processors, one or more computer readable memories, one or more computer readable storage media, and program instructions stored on the one or more storage media for execution by the one or more processors via the one or more memories, the program instructions comprising:
   program instructions to determine an original point in time to perform an action on a record by summing an original retention base and an original retention period within a disposition schedule;
   program instructions to determine that the original retention period within the disposition schedule has changed; and
   program instructions to generate an updated point in time based on the change, to perform an action on a record, by summing the original retention base and the changed retention period, wherein the action is defined for a phase of the disposition schedule.

14. The computer system of claim 13, wherein the disposition schedule defines additional properties and instructions for disposal of the record having metadata and a reference to a document, and wherein the additional properties comprise a condition that if satisfied permits the disposal of the record.

15. The computer system of claim 13, wherein the action comprises at least one of transfer, review, destruction, and archival of the record.

16. The computer system of claim 13, wherein the original retention base references a property that is a calendar date, and wherein the original retention period references a property that is a duration of time, and wherein the original retention base and the original retention period are used to generate the original point in time at which the action is performed on the record.

17. The computer system of claim 13, wherein the action is performed on the record if a trigger condition within the disposition schedule is satisfied.

18. The computer system of claim 13, wherein the action is performed in accordance with one or more rules associated to the record.

* * * * *